US005530656A

United States Patent [19]

Six

[11] Patent Number: 5,530,656

[45] Date of Patent: Jun. 25, 1996

[54] METHOD FOR CONTROLLING THE INK FEED OF A PRINTING MACHINE FOR HALF-TONE PRINTING

[75] Inventor: Hans J. Six, Munich, Germany

[73] Assignee: MAN Roland Druckmaschinen AG, Germany

[21] Appl. No.: 327,377

[22] Filed: Oct. 21, 1994

[30] Foreign Application Priority Data

Oct. 21, 1993 [DE] Germany .......................... 43 35 853.5

[51] Int. Cl.$^6$ ........................................................ G01J 3/00

[52] U.S. Cl. .......................... 364/526; 356/425; 101/365; 101/211

[58] Field of Search ..................................... 364/526, 552, 364/551.01, 571.01; 395/105, 104; 101/134, 181, 136, 335, 211, 365; 356/425, 407, 402, 406; 250/226, 566; 358/523, 534

[56] References Cited

U.S. PATENT DOCUMENTS

| | | | |
|---|---|---|---|
| 4,527,897 | 7/1985 | Okabe | 356/407 |
| 4,649,502 | 3/1987 | Keller et al. . | |
| 4,665,496 | 5/1987 | Ott | 364/526 |
| 4,667,596 | 5/1987 | Dotzel et al. | 101/211 |
| 4,671,661 | 6/1987 | Ott | 356/402 |
| 4,706,206 | 11/1987 | Benoit et al. | 364/526 |
| 4,717,954 | 1/1988 | Fujita et al. | 358/523 |
| 4,752,892 | 6/1988 | Lecha | 395/104 |
| 4,813,000 | 3/1989 | Wyman et al. | 364/526 |
| 4,884,221 | 11/1989 | Sugiyama et al. | 364/526 |
| 4,975,862 | 12/1990 | Keller et al. | 364/526 |
| 5,182,721 | 1/1993 | Kipphan et al. . | |

FOREIGN PATENT DOCUMENTS

| | | |
|---|---|---|
| 0143744 | 10/1984 | European Pat. Off. . |
| 227094A1 | 9/1985 | Germany . |
| 3925012A1 | 5/1990 | Germany . |
| 3925011A1 | 5/1990 | Germany . |
| 2222112 | 8/1988 | United Kingdom . |
| 2222880 | 8/1988 | United Kingdom . |

OTHER PUBLICATIONS

US–Z: Research Disclosure, Jun. 1992, pp. 460, 461.

*Primary Examiner*—James Trammell
*Attorney, Agent, or Firm*—Leydig, Voit & Mayer, Ltd.

[57] ABSTRACT

A method for controlling the ink feed of a printing machine, especially an offset printing machine, for printing four-color half-tone combined prints. In selected test regions in an original and in the corresponding test regions in the printed sheet, the standard color values of the four-color overprint are determined. The infrared color density for the black printing ink is determined in the near infrared. The standard color values of the four-color overprint are converted by means of a linear transformation into standard color values corresponding to the combined print of only the three chromatic colors. The coefficients of the linear transformation are determined empirically as a function of the infrared color density of the black printing ink. From the standard color values of the three-color print, the effective surface coverage values of the three chromatic colors are determined via the modified Neugebauer equations. The effective surface coverage value of the black ink is determined from the infrared color density according to an empirical relationship. The settings for the ink feed elements of the printing machine are adjusted according to the differences in the effective surface coverage values between the original and the printed product.

4 Claims, 3 Drawing Sheets

METHOD FOR CONTROLLING THE INK FEED OF A PRINTING MACHINE FOR HALF-TONE PRINTING

FIELD OF THE INVENTION

The invention is related to a method for controlling the ink feed of a printing machine, and more particularly to a method for controlling the ink feed of a printing machine for printing four-color half-tone prints.

BACKGROUND OF THE INVENTION

The visual color impression of offset-printed products is produced by means of an interaction of subtractive and additive color mixing. In a half-tone print the individual points of each printing ink are printed in various sizes, both next to each other and more or less overlapping each other. Each ink point has a finite thickness and the effect corresponds to a filter lying on the white printed material. The color direction of the combined print is determined both by the layer thickness of the applied printing ink and by the geometric area coverage of the half-tone points. By means of varying the adjustment of the ink feed elements in the individual printing units, the color locus of a printed image point can thus be varied. Generally in color printing, three chromatic colors cyan, magenta, and yellow and a fourth printing ink, black, are printed.

In the printing industry it has been common to use simultaneously printed special measuring fields on the printed product, such as test strips, for the purpose of detecting the ink application on a printed product. The simultaneously printed special measuring fields are photoelectrically detected, and a measure for the applied quantity of ink is derived therefrom. This method is mostly carried out by means of densitometers, as there exists a relatively simple relationship between ink density value and layer thickness of the ink. This ink feed control method has several disadvantages. For example, the densitometric determination of the ink feed permits no numeric statements with regard to the visual color perception. Another disadvantage of monitoring the ink feed on simultaneously printed special measuring elements is that space on the printed material is used for these measuring fields. Furthermore, since color monitoring is done only on the special measuring fields, the ink application is controlled only to achieve the desired color impression of these measuring fields. The color impression of the actual subject is correspondingly only varied indirectly, and correct color impression of the special measuring fields does not guarantee correct color impression of the printed product.

U.S. Pat. No. 5,182,721 discloses a method for the control of ink application in a printing machine, in which method test regions are measured calorimetrically on the printed sheet. Color loci are determined from calorimetric measurements with reference to a selected color coordinate system. Color distances between the actual values of the printed copy and the desired values of the original are formed and the control data are to be determined from these color distances. This method uses a dependence of the color locus coordinates, to be determined empirically, as a function of an alteration of the layer thickness of the printed ink.

This method works calorimetrically, and the determined color loci and color distances permit conclusions about the visual color impression. However, because of the described method of calculating setting commands for the ink feed via the partial derivatives of the color locus coordinates with respect to the color densities of the relevant printing inks, this principle appears to work only in the case of simultaneously printed special measuring fields. This document alone does not disclose how setting commands for the ink feed can be obtained by means of measurements directly on the printed product.

German patent document DD 227 094 A1 discloses a method for the calorimetric evaluation of printed products. By means of measuring devices in the machine, the color locus coordinates of specific test regions are determined and, by means of the Neugebauer relationship, degrees of area coverage of the printed inks are determined therefrom. If the color black is also printed in addition to the chromatic colors,, then a second calorimetric measuring device for this color is necessary, which can be disadvantageous.

U.S. Pat. No. 4,649,502 discloses a method for assessing the print quality as well as for controlling the ink feed. The reflectance is measured in four spectral regions on image elements in the subject using one or more measuring heads. According to the patent, the color reflectance values for the chromatic colors as well as a spectral reflectance in the infrared region for the black printing ink are determined. Area coverage values are determined by means of the Neugebauer equations. This is carried out at the same image points of the copies printed on the machine as on a desired original. Setting commands for the ink feed of the printing machine can be derived from the comparison of desired and actual surface coverages of the printing inks.

From the prior art it is thus known to determine the geometric area coverages of test regions either by means of color reflectance values or color coordinates of the test regions, and to determine therefrom control variables for the ink feed. As is known, the Neugebauer relationship when extended to four colors describes the theoretical relationship between the color locus of a four-color combined print and the degrees of geometric area coverage of the individual colors and their combined prints. In this case the standard color values for the individual colors, the combinations of the combined prints, and the paper-white are determined on full-surface-printed samples. Since light scattering and light gathering are not taken into account, the geometric area coverages determined in this way and the ink feed change determined from a desired v. actual comparison can only deliver inaccurate results. As is known, in a half-tone structure it is the optically effective surface coverage which is decisive of the color impression, not the geometrical surface coverage.

SUMMARY OF THE INVENTION

It is a general object of the present invention to provide a method that allows the control of the ink feed with high accuracy to minimize differences in color impression between a half-tone printed product and the original. It is a related object to provide a method that controls the ink feed according to a representation of the results of color measurement which accurately reflects the differences in color impression between a printed product and the original.

In this respect, it is a feature of the present invention to derive from reflectance measurement the optically effective surface coverage values for the four printing inks on test regions on the original and the printed product. Accurate adjustments of the settings of the ink feed elements of the printing machine can be made according to the optically effective surface coverage values to minimizing the difference in color impression between the original and the printed product.

According to the present invention, as an intermediate step in the derivation of the optically effective surface coverage values, standard color values of the four-color half-tone test regions are determined from measured reflectance values. It is a feature of this invention that the standard color values of the four-color print are converted into standard color values of a print printed with only the three chromatic inks. The conversion is by means of a linear transformation with empirically determined coefficients. This conversion removes the alteration of the color locus due to the presence of the black ink, thereby allowing accurate determination of the effective area coverage values of the chromatic inks.

It is a further feature of the present invention to derive the effective surface coverage values of the chromatic inks from the standard color values of the three-color print through the modified Neugebauer relationship.

Other objects and advantages will become apparent from the following detailed description when taken into account with the drawings, in which:

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications, and equivalents included within the spirit and scope of the invention as defined by the appended claims. For instance, in the following description the control of ink feed of a sheet-fed offset printing machine is used as example, but the invention is not limited to offset printing only, and other types of printing are also covered.

Figure 1:
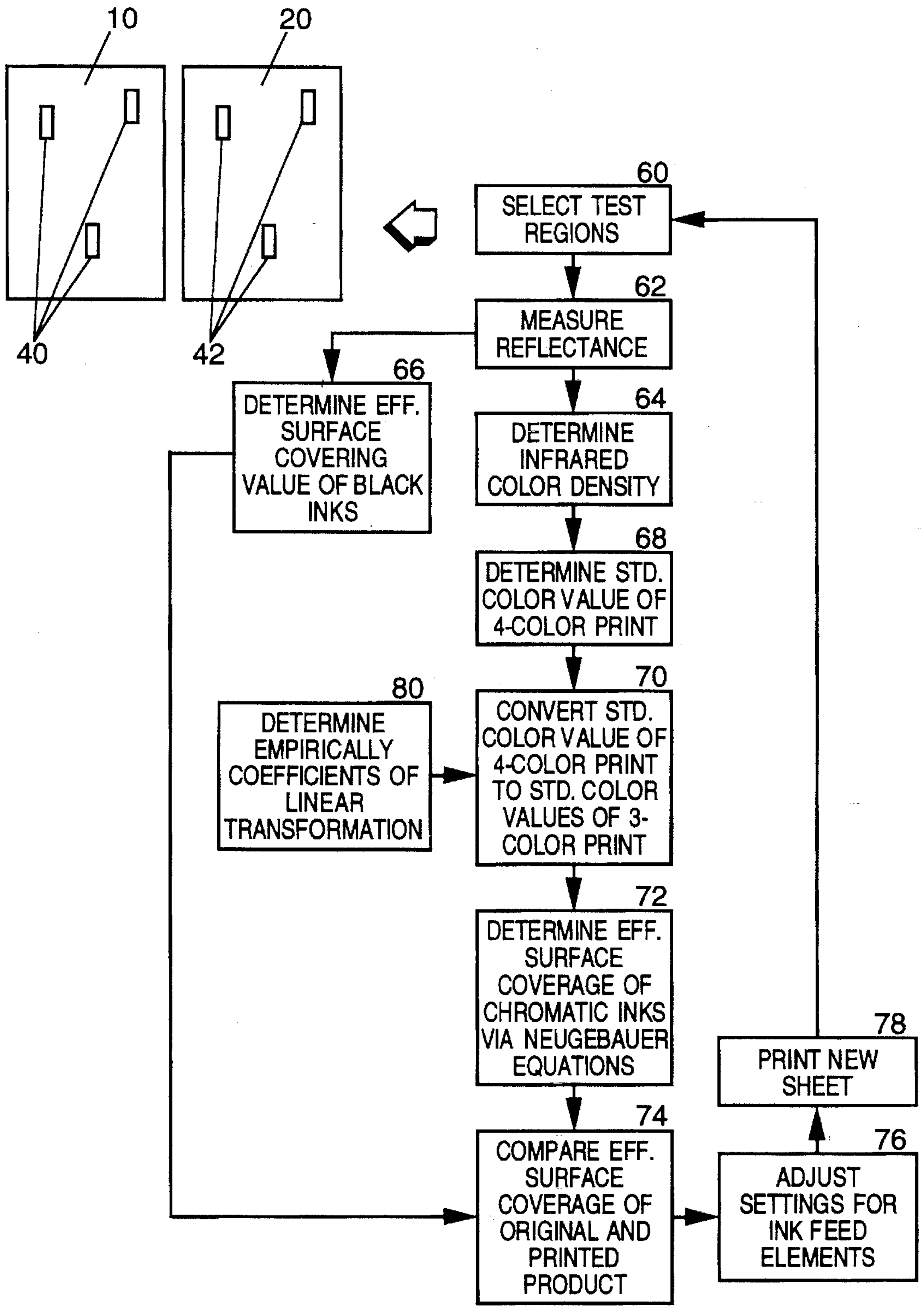
FIG. 1 shows a schematic diagram which illustrates the steps of the method of this invention for controlling the ink feed of a printing machine.

Turning now to the drawings, FIG. 1 shows a schematic diagram which illustrates the steps of the method according this invention. The present method controls the ink feed of a printing machine based on the color differences between a printed sheet 20 and an original 10. The original may be a so-called OK-sheet which is a printed sheet that is deemed satisfactory. The goal of the method is to minimize the deviation in the calorimetric appearance of their image of the printed sheets from the original sheet.

As a first step of the present method, a plurality of test regions 40 on the original sheet 10 and the corresponding test regions 42 on the printed sheet 20 are established. The test regions are selected because they are especially important for the image, or show especially typical or difficult nuances of color, or are otherwise typical of the entire image build-up. It is to be assumed in this example that all these test regions have been produced by means of a combined print of the three chromatic colors and the color black in half-tone. In the following description, the method according to the invention is described for one test region 40 of the original sheet 10 and the corresponding test region 42 of the printed sheet 20. The same procedure is used correspondingly for the remaining test regions.

After the test regions are selected, the spectral reflectance of the test regions are measured as indicated in FIG. 1 as step 62. By means of a spectrophotometer, the spectral reflectance of a test region 40 on the original sheet 10 and the spectral reflectance of the corresponding test region 42 on the printed sheet 20 are detected.

If a multiplicity of test regions are measured on the original sheet and the printed sheet and compared with one another, it is advantageous if the reflectance measuring device is mounted on a device which can move in one plane and is automatically controlled. With a device of this type, a multiplicity of stored test regions can be selected and automatically measured. For this purpose, the original sheet is first laid on the surface of this device and then measured. Exactly the same procedure is followed with the printed sheet.

In order to isolate the absorption effect of the black printing ink, the reflectance from the test area is also measured with light outside the visible region. According to this method, the spectrophotometer used also supplies spectral intensities in the near infrared at wavelengths between 0.85 micron and 1.0 micron. In this given wavelength range of the near infrared, a narrow-band infrared color density is now determined. This narrow-band infrared color density is hereinafter designated DIR.

Instead of using a single spectrophotometer for detecting both the color locus and the infrared color density, a color measuring device (spectral; three-region) to which an infrared color density measuring device is connected can also be used. In that case a beam splitter is used to distribute the reflected light to both devices.

From the spectral reflectance values, the X, Y, Z components of the color values for each test region are determined according to the standardized sensitivity curves of a CIE (Commission Internationale de l'Eclairage) normal observer. The standard color values of the test region are hereinafter designated X(CMYB), Y(CMYB), Z(CMYB). The label CMYB indicates that the test region is printed with the four colors cyan, magenta, yellow, and black. By using the well known transformation equations, color loci of the CIE-L*u*v color space can be determined therefrom. For this test region on the original sheet, one therefore obtains the desired color locus. The color locus of the corresponding test region in the printed sheet thus represents the actual, or as-printed, color locus.

The color values X(CMYB), Y(CMYB), Z(CMYB) are not directly useful for controlling the ink feed of the three chromatic colors. This is due to the fact that the black printing ink does not only represent a pure "filter function". The presence of the black printing ink yields not a pure alteration of the brightness of a four-color overprinting with respect to the associated overprinting of the three chromatic colors C, M, Y. Rather the presence of the black printing ink also leads to a slight alteration of the color locus.

According to the present invention, the standard color values of the four-color test region are converted to the standard color values the test region would have if the color black is removed from the test region. In other words, the converted standard color values correspond to the standard color values of a three-color print which is otherwise identically printed as the test region except for the lack of black ink. The standard color values of the color locus, which results when only the chromatic colors cyan, magenta, yellow are printed, are designated hereinafter as X(CMY), Y(CMY), Z(CMY). The conversion of the standard color values X, Y, Z of the four-color combined print into the standard color values of the hypothetically resulting three-color combined print effectively removes the "color locus alteration" effect caused by the presence of the black ink.

The present invention makes use of the recognition that the color values of the hypothetical three-color print can be determined from the color values of the four-color print via an empirical relationship, which depends on the infrared color density value DIR of the print.

According to this invention, for the conversion of the standard color values of the four-color combined print into the standard color values of the hypothetical three-color print, the following relationship is used:

$$X(CMY)=ax(1)\ X(CMYB)+ax(2),$$

$$Y(CMY)=ay(1)\ Y(CMYB)+ay(2),$$

$$Z(CMY)=az(1)\ Z(CMYB)+az(2).$$

The standard color values of the four-color overprinting in the test region are thus converted linearly into another color locus. The conversion coefficients ax(1), ax(2), ay(1), ay(2), az(1), and az(2) used in this case are not constant parameters, but are functions of the measured infrared color density DIR of the test region. In other words, the values of coefficients are determined by the measured DIR. The relationship of these parameters with the infrared color density DIR is determined empirically. The method for determining empirically the coefficients are described in full detail in a latter part of this description.

As described above, the presence of the black printing ink leads to a slight alteration of the color besides the reduction of brightness. Such color-alteration effect is expressed by means of the coefficients ax(2), ay(2) and az(2). Since these coefficients depend on the infrared color density DIR, the result is that the "color locus alteration" effected by the presence of the black printing ink is likewise a function of the half-tone value (proportion of printing area) of the black printing ink.

The standard color values X(CMY), Y(CMY), Z(CMY), which result theoretically if only the three chromatic colors had been printed together, now serve as a starting point for the calculation of the optically effective surface coverage values EFF(C), EFF(M), EFF(Y) respectively for the colors cyan, magenta, and yellow. These effective surface coverage values for the three chromatic colors, as well as the effective surface coverage value EFF(B) for the color black, are dimensionless and signify the optically effective color-covered area component of a unit area. The advantage of using effective surface coverage values instead of geometric surface coverage values is that the former takes into account the scattering effects.

For calculating the effective color areas for the three chromatic colors, the method uses a system of modified Neugebauer equations. The modified Neugebauer equations used in this invention proceed from the same mathematical formulation as the generally known Neugebauer equation. As is known, the standard color values of a three-color overprinting can be calculated via the Neugebauer equations by coupling together the geometric area coverages of the three chromatic colors in full-tone and of the paper-white, and the standard color values of the corresponding full-tone overprintings.

According to the present invention, in the modified Neugebauer equations, the above described effective surface coverage values of the three chromatic colors are used instead of the geometric area coverages. It is furthermore provided that, instead of the standard color values for the respective full-tone color areas (individual and in combined print), standard color values are used which take into account the variations on printed half-tone areas caused by scattering effects. These data are determined on a printed sample table which contains a determined quantity of defined CMY color fields, which consist essentially of screened color areas—individually and also in overprinting—of defined components.

The system of Neugebauer equations consists of three equations, one for each standard color value of the three-color field. The Neugebauer equation is reproduced here in a vector representation.

$$\begin{pmatrix} X(CMY) \\ Y(CMY) \\ Z(CMY) \end{pmatrix} =$$

$$(1-EFF(C))(1-EFF(M))(1-EFF(Y))\cdot\begin{pmatrix} X(W) \\ Y(W) \\ Z(W) \end{pmatrix} +$$

$$EFF(Y)(1-EFF(M))(1-EFF(C))\cdot\begin{pmatrix} X(Y) \\ Y(Y) \\ Z(Y) \end{pmatrix} +$$

$$(1-EFF(Y))EFF(M)(1-EFF(C))\cdot\begin{pmatrix} X(M) \\ Y(M) \\ Z(M) \end{pmatrix} +$$

$$(1-EFF(Y))(1-EFF(M))EFF(C)\cdot\begin{pmatrix} X(C) \\ Y(C) \\ Z(C) \end{pmatrix} +$$

$$EFF(Y)EFF(M)(1-EFF(C))\cdot\begin{pmatrix} X(YM) \\ Y(YM) \\ Z(YM) \end{pmatrix} +$$

$$EFF(Y)(1-EFF(M))EFF(C)\cdot\begin{pmatrix} X(YC) \\ Y(YC) \\ Z(YC) \end{pmatrix} +$$

$$(1-EFF(Y))EFF(M)EFF(C)\cdot\begin{pmatrix} X(MC) \\ Y(MC) \\ Z(MC) \end{pmatrix} +$$

$$EFF(Y)EFF(M)EFF(C)\cdot\begin{pmatrix} X(YMC) \\ Y(YMC) \\ Z(YMC) \end{pmatrix}$$

In the above mentioned formulation, EFF(C), EFF(M), EFF(Y), as already mentioned, represent the effective surface coverage values for the three chromatic colors C, M, Y. X(W), X(C), X(M), X(Y), Y(W), Y(C), . . . , Z(Y) are the standard color values of the paper white W or of a cyan-, magenta- or yellow-colored half-tone field determined in a calorimetric way. X(CM), X(CY), X(MY), X(CMY) are the corresponding standard color values for two- or three-color half-tone fields printed over each other. These values are determined in sample prints (sample table) and stored for later calculation.

By means of the three equations indicated above, the effective surface coverage values EFF(C), EFF(M), EFF(Y) for the three chromatic colors are now calculated. For this purpose, the standard color values X(CMY), Y(CMY), Z(CMY) determined in step 70 in FIG. 1 are inserted into the modified Neugebauer equations and the equations are solved for the effective surface coverage values.

From the infrared color density DIR of the test region, the effective color area EFF(B) for the color black is determined via an empirical relationship between the infrared color density DIR and the effective color area of the color black. To determine these parameters, printing trials are carried out. For this purpose, a series of half-tone fields of the color black is printed on a sample sheet, the half-tone value being varied in steps or continuously. The infrared color density DIR of the half-tone fields can be determined from infrared reflectance values. The effective color area EFF(B) can be measured, for example, by means of video technology or planimetrically. From the measured infrared color density DIR and the effective color area EFF(B) of the half-tone fields, a functional representation of the relationship EFF(B)=fkt(DIR) is obtained by means of interpolation.

Corresponding to the previous description, the effective surface coverage values for the color black and for the three chromatic colors are calculated for each test region of the original sheet and the corresponding test region of the printed sheet. The differences between the effective surface coverage values of a test region in the original sheet and those of the corresponding test region in the printed sheet are formed. These differences are then converted via empirical relationships into setting commands for the ink feed elements. The empirical relationships take into account particularly the behavior of the inking system, the construction of the inking system of the printing machine and the properties of the printing inks used.

After the ink feed elements have been altered on the basis of the calculated setting commands as described above, new sheets are printed. Thereupon follows the repetition of the method and, if necessary, the calculation of corrections from stored data for the parameters used in the empirical equations for matching to the current printing conditions. The repetition continues until the difference between the color loci of the test regions of original and printed sheet falls below predetermined tolerances.

Figure 2A:
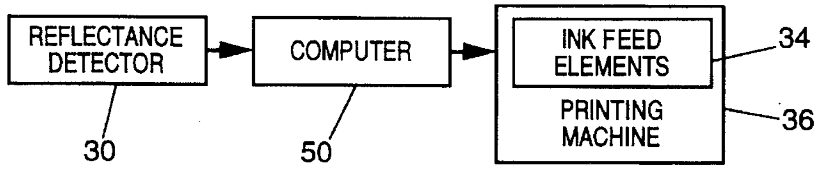
FIG. 2A is a simplified block diagram showing a printing system operating according to the present invention.

According to the present invention, it is preferred to use a computer to handle the derivation of effective surface coverage values from the reflectance values, as well as the generation of ink feed setting adjustment values. In other words, steps 4, 66, 68, 70, 72, 74, 76, 78, and 80 in FIG. 1 are preferably performed by a computer which is properly programmed. FIG. 2A is a simplified block diagram showing the printing system operating according to the present invention. As shown in FIG. 2A, the reflectance values measured with the reflectance detector 30 are sent to a computer 50 for the above describe data processing. The computer 50 generates setting adjustment data which are used to control the settings of the ink feed elements 34 of the printing machine 36. The ink feed setting adjustment can be performed either manually or automatically.

Figure 2B:
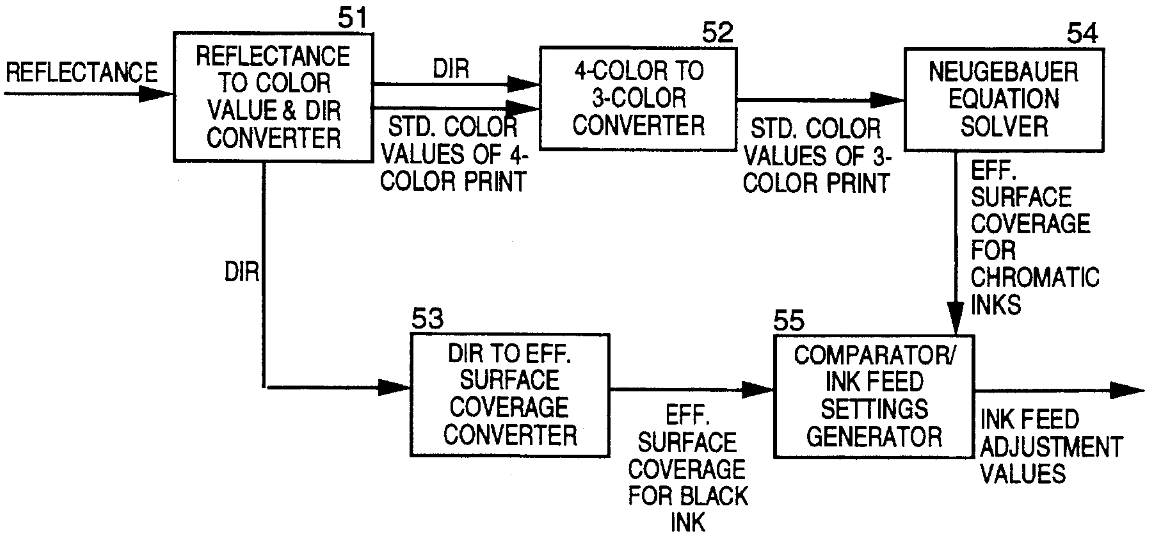
FIG. 2B shows a possible arrangement of the computer processing according to the present invention into function modules.

FIG. 2B shows, as an example, one possible arrangement of the computer processing into function modules. The reflectance data are the input of the reflectance to color value & DIR converter module 51, which determines the standard color values of the four-color print and DIR. The 4-color to 3-color converter module 52 converts the standard color values of the four-color print into the standard color values of the corresponding three-color print via a linear transformation with empirically determined coefficients. The Neugebauer equations solver module 54 then calculates the effective surface coverage values for the three chromatic inks from the standard color values of the three-color print. The effective surface coverage values for the chromatic inks and the effective surface coverage value for the black ink, which is determined in the DIR to effective surface coverage converter module 53, are used by the comparator/ink setting generator module 55 to determine the setting adjustment values for the ink feed elements of the printer 36 in FIG. 2A.

The empirical determination of the coefficients ax(1), ax(2), ay(1), ay(2), az(1), az(2) of the linear transformation in step 80 in FIG. 1 is now described as follows. In this case, a description is given of the empirical determination of the coefficients ax(1), ax(2) for the linear transformation of the standard color value X(CMY) from the standard color value for the four-color overprinting X(CMYB). The procedure for the determination of the coefficients ay, az for the transformation of the standard color values Y(CMY), Z(CMY) from the standard color values Y(CMYB), Z(CMYB) is analogous in this case.

Figure 3:
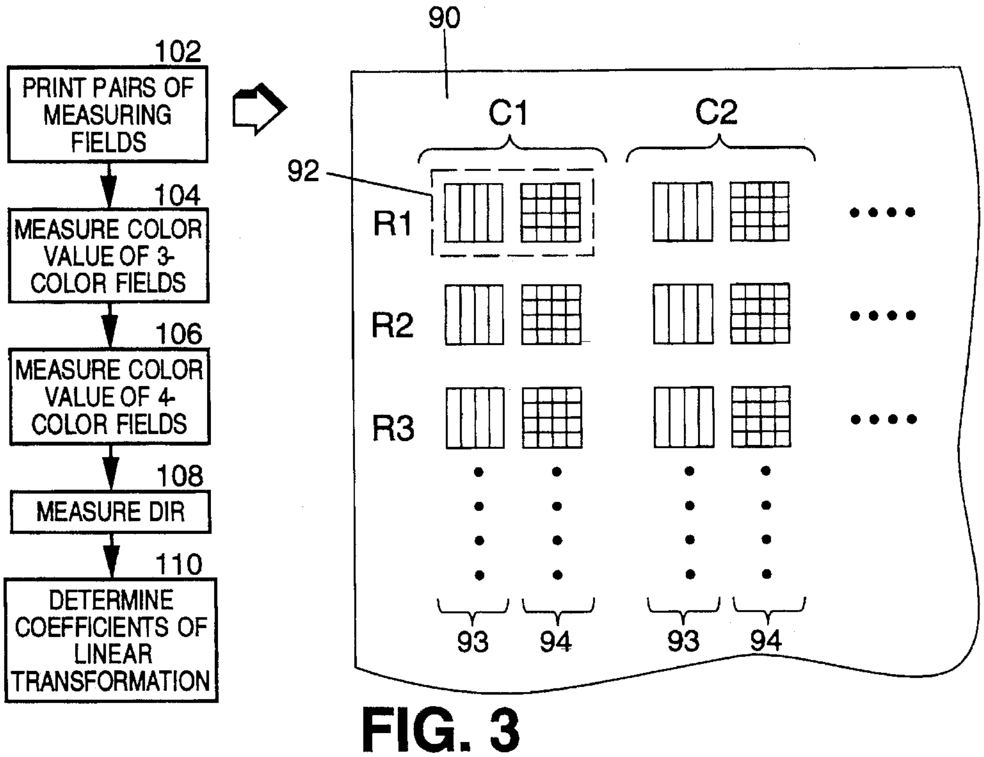
FIG. 3 shows a schematic diagram which illustrates the steps of determining the empirical coefficients for the linear transformation which converts the standard colors values of a four-color print to those of a three-color print.

FIG. 3 shows a schematic diagram illustrating the steps for determining the empirical coefficients. A special sample print 90 is produced which contains a multiplicity of three-color measuring fields 93 and four-color measuring fields 94. FIG. 3 shows a section of an exemplary arrangement of the measuring fields 93, 94 on the sample print 90.

In FIG. 3 the measuring fields on the sample print 90 are arranged in pairs, each pair having one three-color test field and one four-color test field. For example, one test field pair 92 in FIG. 3 is enclosed in a box of broken line. In each of the three-color test fields 93 the three chromatic colors C, M, Y having a predetermined half-tone value (proportion of printing area) are printed. The four-color test field in the pair has the same half-tone value in the three chromatic colors, as well the black color B having another predetermined half-tone value. Thus the three-color test field and the four-color test field in the same pair are otherwise identically printed except that there is no color black in the three-color field. The test field pairs can be further arranged on the sample sheet like a matrix. In FIG. 3 the rows are labeled R1, R2, R3, . . . , and columns C1, C2, . . . In each column, it is preferred that the half-tone value of the black ink in the four-color test fields remains constant and that the half-tone value of the three chromatic colors shows gradation along the column. The grading of the test fields may, for example, be such that the proportions of printing areas are varied by 10% from one pair to a adjacent pair in the same column. Different columns are preferred to have different half-tone value of the black color.

On each of the test fields, the standard color values X, Y, Z are determined from reflectance measurement. For the following discussion, the color values of the three-color test fields 93 are designated X(CMY), Y(CMY), and Z(CMY), and those of the four-color test field 94 are designated X(CMYB), Y(CMYB), and Z(CMYB). The infrared color density DIR is determined additionally on the each of the four-color fields 94. Because of the grading of half-tone values of the chromatic colors, the color values X, Y, Z are varied along the column. The infrared color density DIR, on the other hand, remains virtually constant in a column due to the constant half-tone value of the black color.

Figure 4:
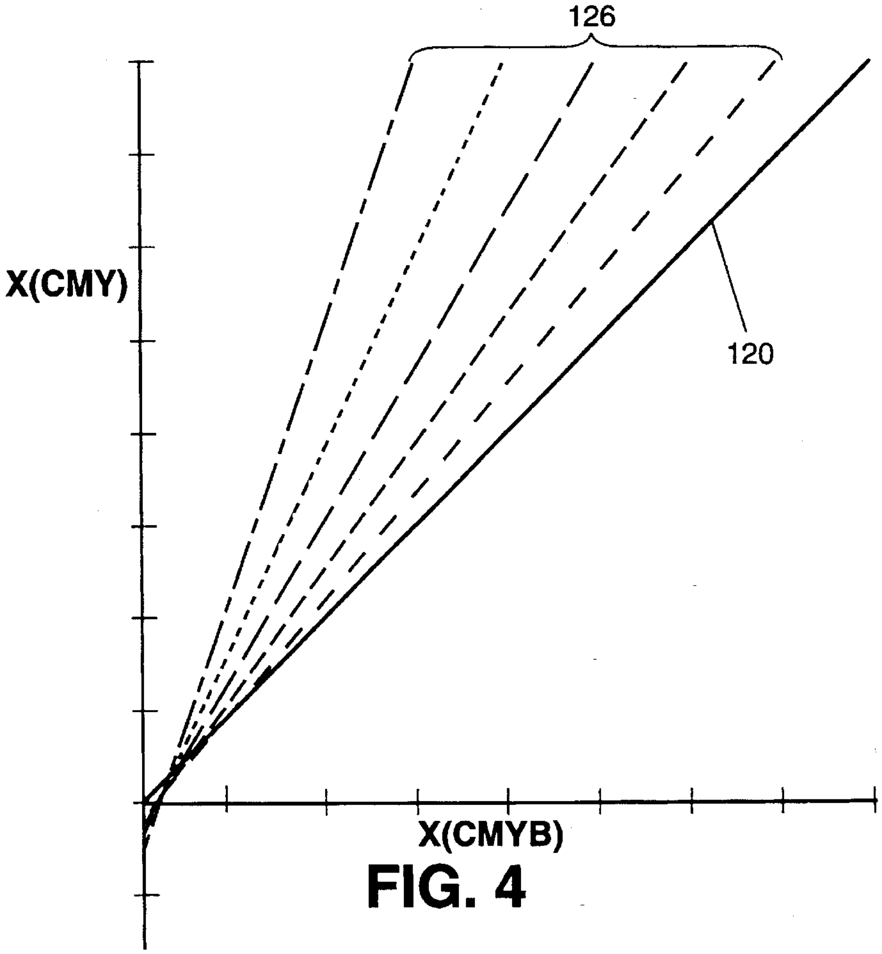
FIG. 4 shows a group of straight lines representing the linear relationship as a function of the infrared color density between the standard color values of a four-color print and those of a three-color print.

In FIG. 4, the standard color value X(CMYB), which results on the four-color test fields 94 is shown as abscissa. Correspondingly, the ordinate represents the standard color value X(CMY) which results on the three-color test fields 93. Each pair of test fields then provides one point (X(CMYB);X(CMY)) in the diagram according to FIG. 4. It has been found empirically that the measured points (X(CMYB);X(CMY)) of the pairs with the same half-tone in black lie virtually on a straight line.

In FIG. 4 various straight lines 126 are plotted, with each straight line representing a series of measurements on a group of test field pairs having the same half-tone value of the black printing ink in the four-color test fields. The bisector 122 between ordinate and abscissa represents the straight line which results when the four-color fields contain no color black. The slopes of the lines 126 increase with the half-tone value of the black printing ink. Since the infrared color density DIR depend virtually solely on the half-tone value of the black ink, each straight line in FIG. 4 is associated with a value of the infrared color density DIR.

As shown in FIG. 4, these straight lines intersect both the bisector 120 (where area covering of the black printing ink=0) and the ordinate. Because the straight lines have different slopes, they intersect the ordinate at different points, and different ordinate intersection points result.

Now that the correlation of the standard color value X(CMY)/X(CMYB) has been established for various half-tone values of the color black, it is possible for each half-tone value of the color black to extract from the diagram according to FIG. 4 the coefficients ax(1), ax(2) , which are respectively the slope and the ordinate intercept of the line associated with that particular half-tone value. Since each straight line also corresponds to a known infrared color density DIR, these infrared color densities DIR can now be assigned to the corresponding coefficients ax(1), ax(2). By means of the application of interpolation methods, the dependence ax(1) and ax(2) on the infrared color density can now be represented functionally. Two functions: ax(1)=fx1(DIR) and ax(2)=fx2(DIR) are thus obtained. Correspondingly, by evaluation of the correlations Y(CMY)/Y(CMYB) and z(CMY)/z(CMYB), interpolation functions ay(1)=fy1(DIR), ay(2)=fy2(DIR), az(1)=fz1(DIR), az(2)=fz2(DIR) can likewise be determined.

It will now be appreciated that what has been provided is a method for controlling the ink feed of a printing machine for half-tone printing. This method compares test regions on the original with corresponding test regions on the printed product, and adjusts the ink feed according to the deviation in effective area covering values of the inks. To accurately determine the effective area covering value of the three chromatic inks, the standard color values of the four-color test regions are first converted to the standard values of a three-color overprinting. The conversion according to this invention is through a linear transformation with empirically determined coefficients. The effective area covering values of the three chromatic inks are then derived from the standard color values of the three-color print through the use of the modified Neugebauer relation.

What is claimed is:

1. A method for controlling the ink feed elements of a printing machine operated in half-tone, in particular an offset printing machine, the method comprising the steps of:

selecting test regions on an original and corresponding test regions on a printed product printed in printing inks of three chromatic colors and the color black;

detecting photoelectrically reflectance values of the selected test regions, wherein for the black printing ink the reflectance is detected in the near infrared spectral range;

determining the infrared color density for the black printing ink from the reflectance in the near infrared spectral range;

determining from the reflectance values of the test regions the standard color values of the four-color printing;

converting via a linear transformation the standard color values of the four-color printing to the standard color values of a three-color printing corresponding to a color locus which is produced by the combined print of only the three chromatic color, the coefficients of the linear transformation being determined empirically as a function of the infrared color density of the black ink;

determining the optically effective surface coverage values of the three chromatic colors from the standard color values of the three-color printing;

determining the optically effective surface coverage value of the black ink from the infrared color density via an empirically determined relationship;

adjusting the settings for ink feed elements of the printing machine according to the differences in the effective surface coverage values between the original and the printed product.

2. A method as in claim 1, wherein the effective surface coverage values of the three chromatic colors are determined from the standard color values of the three-color printing using the Neugebauer equations, and the standard color values being used in the Neugebauer equations for the individual color combinations and the overprinting combinations are determined on half-tone areas in printing trials.

3. A method as in claim 1, wherein the method is repeated until the color deviations lie within a predetermined tolerance structure.

4. A method as in claim 1, wherein the method includes the further step of determining empirically, as a function of the infrared color density of the black ink, the coefficients of a linear transformation which converts the standard color values of a four-color printing into the standard color values of a corresponding three-color printing.

* * * * *